(12) United States Patent
Hatfield et al.

(10) Patent No.: US 11,402,643 B2
(45) Date of Patent: Aug. 2, 2022

(54) ADJUSTABLE BONE CONDUCTION SPEAKER FOR HEAD MOUNTED DISPLAY

(71) Applicant: LENOVO (Singapore) PTE. LTD., New Tech Park (SG)

(72) Inventors: Nathan Hatfield, Raleigh, NC (US); Jonathan C. Lee, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 17/080,388

(22) Filed: Oct. 26, 2020

(65) Prior Publication Data

US 2022/0128821 A1    Apr. 28, 2022

(51) Int. Cl.
| | |
|---|---|
| H04R 25/00 | (2006.01) |
| G02B 27/01 | (2006.01) |
| G06F 3/16 | (2006.01) |
| H04R 1/10 | (2006.01) |

(52) U.S. Cl.
CPC .......... *G02B 27/0176* (2013.01); *G06F 3/16* (2013.01); *H04R 1/1091* (2013.01); *G02B 2027/0154* (2013.01); *G02B 2027/0163* (2013.01); *G02B 2027/0178* (2013.01); *H04R 2420/07* (2013.01); *H04R 2460/13* (2013.01); *H04R 2499/15* (2013.01)

(58) Field of Classification Search
CPC ...... G02B 27/0176; G06F 3/16; H04R 1/1091
See application file for complete search history.

(56) References Cited

U.S. PATENT DOCUMENTS

2013/0293448 A1* 11/2013 Jannard .................. G02C 11/06
345/8

* cited by examiner

*Primary Examiner* — Simon King
(74) *Attorney, Agent, or Firm* — Kunzler Bean & Adamson

(57) ABSTRACT

Apparatuses, methods, systems, and program products are disclosed for adjustable bone conduction speaker for head mounted display. An apparatus includes a sliding member couplable to a head mounted display ("HMD") unit and comprising at least one bone conduction speaker, the sliding member adjustable along a first axis to position the bone conduction speaker along the first axis. An apparatus includes a protrusion member coupled to the sliding member and housing the at least one bone conduction speaker, the protrusion member adjustable along a second axis, substantially perpendicular to the first axis, to position the bone conduction speaker along the second axis.

20 Claims, 5 Drawing Sheets

ADJUSTABLE BONE CONDUCTION SPEAKER FOR HEAD MOUNTED DISPLAY

FIELD

The subject matter disclosed herein relates to headsets and more particularly relates to an adjustable bone conduction speaker for a head mounted display.

BACKGROUND

Headsets such as head mounted displays may include speakers such as headphones, earbuds, or the like for providing audio from the head mounted display to the user. However, such speakers may not provide enough privacy for a user or may not work with a user's physical abilities. Bone conduction speakers may be another option used to deliver audio from a head mounted display to a user using vibrations. However, sound quality for bone conduction technology is dependent on the pressure output and the contact integrity between the speaker and the bone.

BRIEF SUMMARY

Apparatuses, methods, systems, and program products are disclosed for adjustable bone conduction speaker for head mounted display. An apparatus, in certain embodiments, includes a sliding member couplable to a head mounted display ("HMD") unit and comprising at least one bone conduction speaker, the sliding member adjustable along a first axis to position the bone conduction speaker along the first axis. An apparatus, in further embodiments, includes a protrusion member coupled to the sliding member and housing the at least one bone conduction speaker, the protrusion member adjustable along a second axis, substantially perpendicular to the first axis, to position the bone conduction speaker along the second axis.

Another apparatus for adjustable bone conduction speaker for head mounted display, in one embodiment, includes a securing member of a head-mounted display ("HMD") unit configured to secure the HMD unit to a user's head. An apparatus, in certain embodiments, includes a sliding member coupled to the securing member and comprising at least one bone conduction speaker, the sliding member adjustable along a first axis to position the bone conduction speaker along the first axis. An apparatus, in further embodiments, includes a protrusion member coupled to the sliding member and housing the at least one bone conduction speaker, the protrusion member adjustable along a second axis, substantially perpendicular to the first axis, to position the bone conduction speaker along the second axis.

A system for adjustable bone conduction speaker for head mounted display, in one embodiment, includes a head mounted display ("HMD") unit comprising at least one display. In some embodiments, a system includes a securing member of the HMD unit configured to secure the HMD unit to a user's head. In various embodiments, a system includes a sliding member coupled to the securing member and comprising at least one bone conduction speaker, the sliding member adjustable along a first axis to position the bone conduction speaker along the first axis. In some embodiments, a system includes a protrusion member coupled to the sliding member and housing the at least one bone conduction speaker, the protrusion member adjustable along a second axis, substantially perpendicular to the first axis, to position the bone conduction speaker along the second axis.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
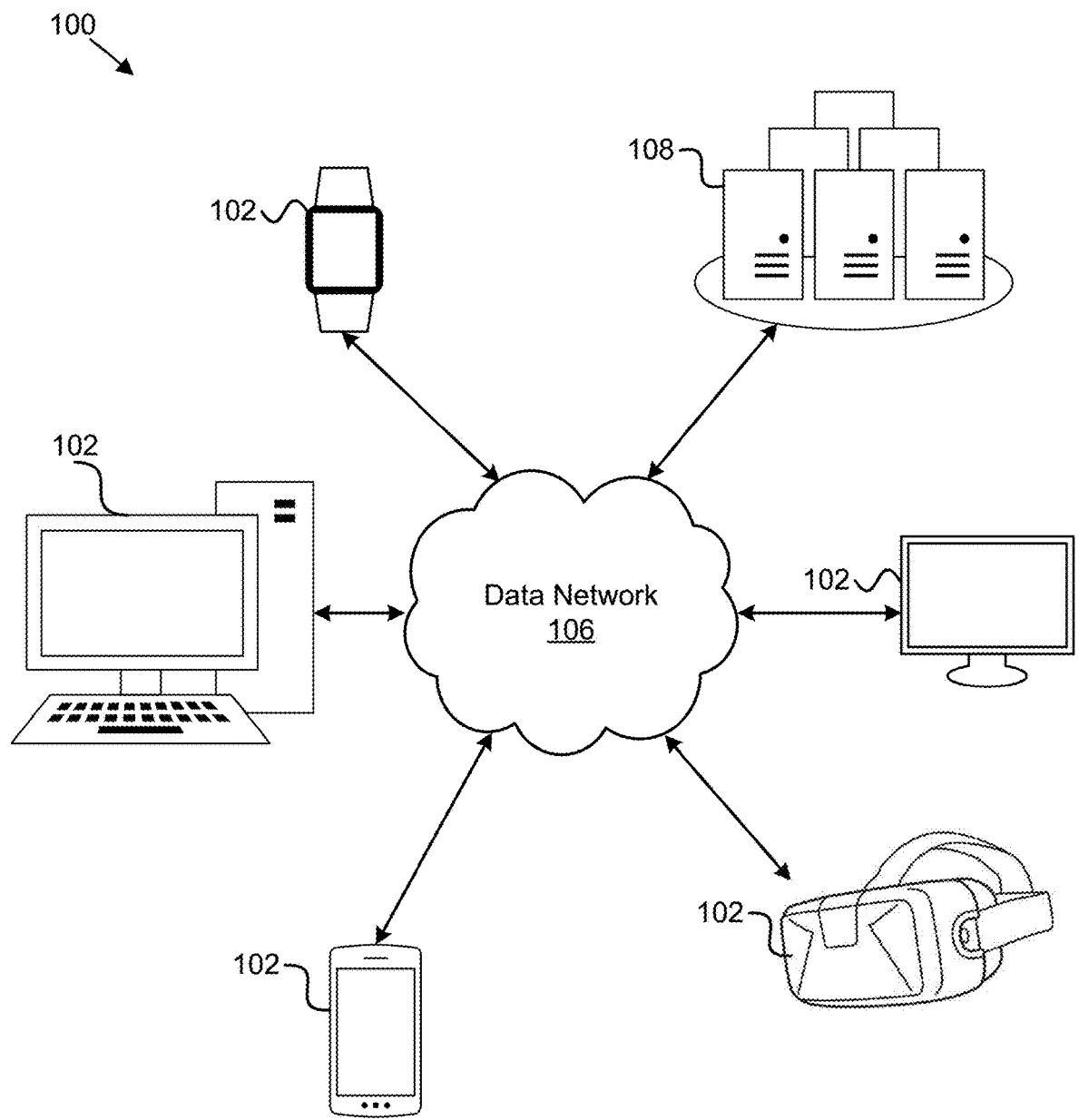
FIG. 1A is a schematic block diagram illustrating one embodiment of a system for adjustable bone conduction speaker for head mounted display.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to emphasize their implementation independence more particularly. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus, in certain embodiments, includes a sliding member couplable to a head mounted display ("HMD") unit and comprising at least one bone conduction speaker, the sliding member adjustable along a first axis to position the bone conduction speaker along the first axis. An apparatus, in further embodiments, includes a protrusion member coupled to the sliding member and housing the at least one bone conduction speaker, the protrusion member adjustable along a second axis, substantially perpendicular to the first axis, to position the bone conduction speaker along the second axis.

In one embodiment, the sliding member further comprises a locking member configured to lock the sliding member in position along the first axis. In some embodiments, the position is one of a plurality of predefined positions located along the first axis.

In one embodiment, the protrusion member is adjustable using an adjustment mechanism to increase or decrease a height of the protrusion member along the second axis. In certain embodiments, the adjustment member comprises a pinwheel member that is rotatable to increase or decrease the height of the protrusion member along the second axis.

In one embodiment, the sliding member and the protrusion member are located on a portion of the HMD unit that is positioned against a side of a user's head. In certain embodiments, the sliding member comprises a plurality of bone conduction speakers along a length of the sliding member that are configured to be selectively turned on and off.

In one embodiment, each of the plurality of bone conduction speakers are selectively turned on in response to pressure detected from pressure sensors in the sliding member that correspond to the plurality of bone conduction speakers sensing a pressure that satisfies a threshold pressure. In certain embodiments, the protrusion member further comprises at least one of a proximity sensor and a pressure sensor, the protrusion member automatically adjusted along the second axis until a proximity that the proximity sensor senses satisfying a proximity threshold and/or a pressure that the pressure sensor senses satisfying a pressure threshold.

Another apparatus for adjustable bone conduction speaker for head mounted display, in one embodiment, includes a securing member of a head-mounted display ("HMD") unit configured to secure the HMD unit to a user's head. An apparatus, in certain embodiments, includes a sliding member coupled to the securing member and comprising at least one bone conduction speaker, the sliding member adjustable along a first axis to position the bone conduction speaker along the first axis. An apparatus, in further embodiments, includes a protrusion member coupled to the sliding member and housing the at least one bone conduction speaker, the protrusion member adjustable along a second axis, substantially perpendicular to the first axis, to position the bone conduction speaker along the second axis.

In one embodiment, an apparatus includes at least one pressure sensor, wherein the at least one bone conduction speaker is activated in response to pressure that the at least one pressure sensor senses satisfying a predefined pressure threshold. In certain embodiments, the at least one bone conduction speaker is located near the at least one pressure sensor on the securing member.

In one embodiment, the sliding member and the protrusion member are located on the securing member at a location that is positioned against a side of a user's head. In certain embodiments, the sliding member further comprises a locking member configured to lock the sliding member in position along the first axis.

In one embodiment, the position is one of a plurality of predefined positions located along the first axis. In some embodiments, the protrusion member is adjustable using an adjustment mechanism to increase or decrease a height of the protrusion member along the second axis. In various embodiments, the adjustment member comprises a pinwheel member that is rotatable to increase or decrease the height of the protrusion member along the second axis.

A system for adjustable bone conduction speaker for head mounted display, in one embodiment, includes a head mounted display ("HMD") unit comprising at least one display. In some embodiments, a system includes a securing member of the HMD unit configured to secure the HMD unit to a user's head. In various embodiments, a system includes a sliding member coupled to the securing member and comprising at least one bone conduction speaker, the sliding member adjustable along a first axis to position the bone conduction speaker along the first axis. In some embodiments, a system includes a protrusion member coupled to the sliding member and housing the at least one bone conduction speaker, the protrusion member adjustable along a second axis, substantially perpendicular to the first axis, to position the bone conduction speaker along the second axis.

In one embodiment, the sliding member and/or the protrusion member are adjustable via one or more digital controls of an interface of the HMD unit. In some embodiments, the bone conduction speaker is one of a plurality of bone conduction speakers that are configured to be selectively turned on and off for spatial audio based on an application executing on the HMD unit.

FIG. 1A is a schematic block diagram illustrating one embodiment of a system 100 for adjustable bone conduction speaker for head mounted display. In one embodiment, the system 100 includes one or more information handling devices 102, one or more data networks 106, and one or more servers 108. In certain embodiments, even though a specific number of information handling devices 102, data networks 106, and servers 108 are depicted in FIG. 1A, one of skill in the art will recognize, in light of this disclosure, that any number of information handling devices 102, data networks 106, and servers 108 may be included in the system 100.

In one embodiment, the system 100 includes one or more information handling devices 102. The information handling devices 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, head phones, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102 and may host, store, stream, or the like files and content to a different device such as documents, videos, music, podcasts, images, games, web pages, augmented and/or virtual reality environments, and/or the like, and may host, store, and make accessible public databases such as blockchain databases, as described in more detail below.

Figure 1B:
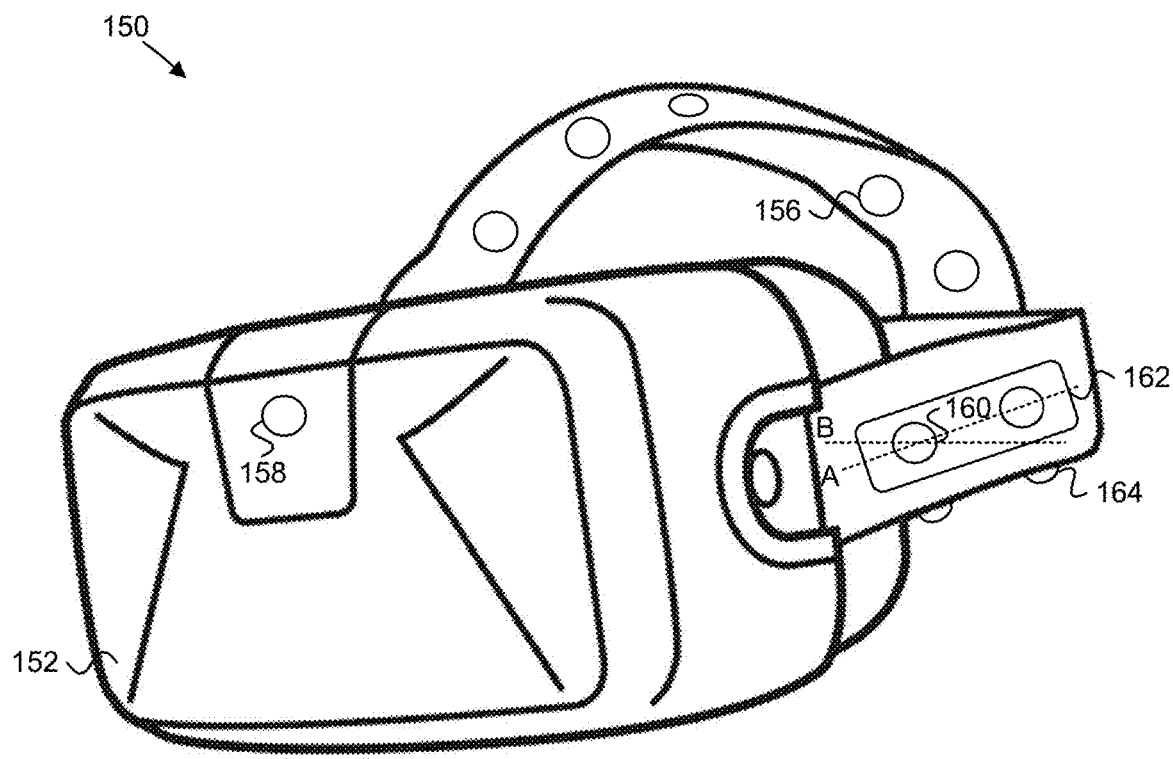
FIG. 1B depicts one embodiment of a head mounted display with an adjustable bone conduction speaker.

FIG. 1B illustrates one example embodiment of an HMD unit 150. The HMD unit 150, as used herein, may refer to a device that is worn on the head or as part of a helmet. An HMD unit 150 may include a display unit 152 that is on the user's face over the user's eyes. The display unit 152 may comprise a single display, two displays corresponding to the user's eyes, or multiple different displays. The display unit 152 may further include a computing device, e.g., logic hardware and software, for performing various functions.

In further embodiments, the HMD unit 150 may include at least one securing member 154, e.g., straps, bands, belts, arms, or the like, for securing the HMD unit 150 to the user's head. The securing members 154 may be adjustable, flexible, or the like to fit to different user's head sizes and characteristics.

The HMD unit 150 may include various sensors 156 on the securing members 154, on the display unit 152, and/or the like. The sensors 156 may include proximity sensors, motion sensors, pressure sensors, biometric sensors, and/or the like. The HMD unit 150 may include at least one camera 158 on the display unit 152 and/or on other parts of the HMD unit 150, e.g., on the securing members 154.

In some embodiments, the HMD unit 150 includes bone conduction speakers 160 that are housed in a protrusion member and coupled to a sliding member 162. As used herein, bone conduction speakers are devices that provide for the conduction of sound to the inner ear primarily through the bones of the skull, allowing the hearer to perceive audio content without blocking the ear canal. Bone conduction transmission occurs constantly as sound waves vibrate bone, specifically the bones in the skull, although it is hard for the average individual to distinguish sound being conveyed through the bone as opposed to sound being conveyed through air via the ear canal. Intentional transmission of sound through bone can be used with individuals with normal hearing—as with bone-conduction headphones—or as a treatment option for certain types of hearing impairment.

The sliding member 162, in one embodiment, is configured to be adjustable along a first axis A to position a bone conduction speaker 160 at a position along the first axis A. In further embodiments, a protrusion member that includes a bone conduction speaker 160 may be adjustable along a second axis B. In certain embodiments, the second axis B intersects the first axis A, and may be substantially perpendicular to the first axis A. In such an embodiment, the bone conduction speaker 160 is manually adjustable by means of a pinwheel 164 that is rotatable to actuate one or more gears or other mechanisms to move the bone conduction speaker 160 along the second axis B, e.g., towards or away from the user's head while the user wears the HMD unit 150. In certain embodiments, the sliding member 162 and/or the bone conduction speaker 160 may be movable by automated means, as described in more detail below.

Figure 1C:
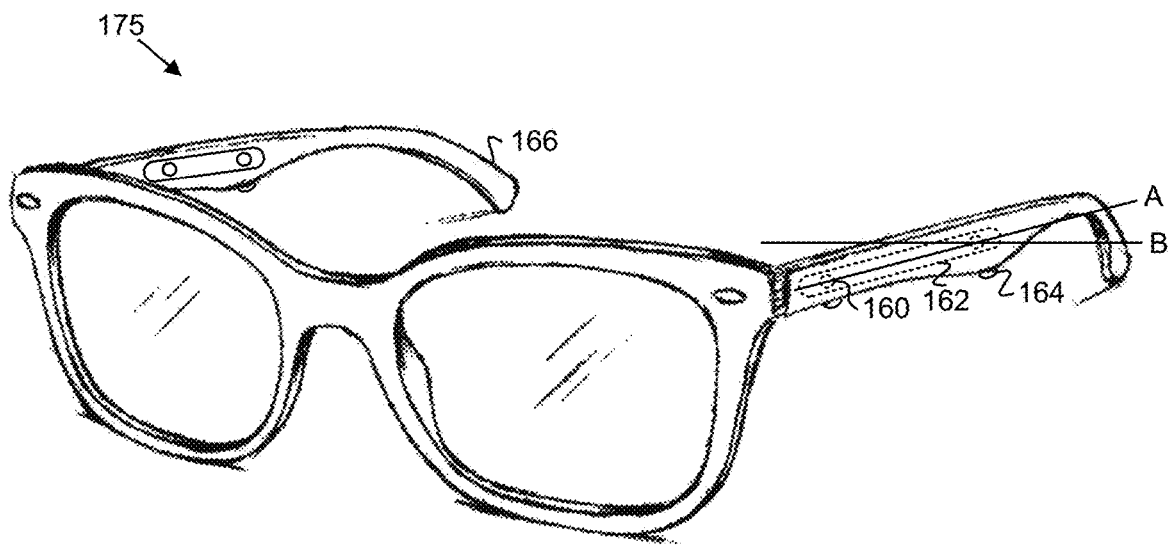
FIG. 1C depicts one embodiment of glasses with an adjustable bone conduction speaker.

FIG. 1C illustrates one example embodiment of glasses 175. The glasses 175 may include optical glasses, sunglasses, smart glasses, and/or the like, that a user wears on the user's head. The glasses 175 may include one or more bone conduction speakers 160 coupled to a sliding member 162 that is attached to, couple to, or integrated with an arm 166 of the glasses 175.

Similar to the HMD unit 150 described above, the sliding member 162, in one embodiment, is configured to be adjustable along a first axis A to position a bone conduction speaker 160 at a position along the first axis A. In further embodiments, a bone conduction speaker 160 may be adjustable along a second axis B. In certain embodiments, the second axis B intersects the first axis A, and may be substantially perpendicular to the first axis A. In such an embodiment, the bone conduction speaker 160 is manually adjustable by means of a pinwheel 164 that is rotatable to actuate one or more gears or other mechanisms to move the bone conduction speaker 160 along the second axis B, e.g., towards or away from the user's head while the user wears the HMD unit 150. In certain embodiments, the sliding member 162 and/or the bone conduction speaker 160 may be movable by automated means, as described in more detail below.

Figure 2A:
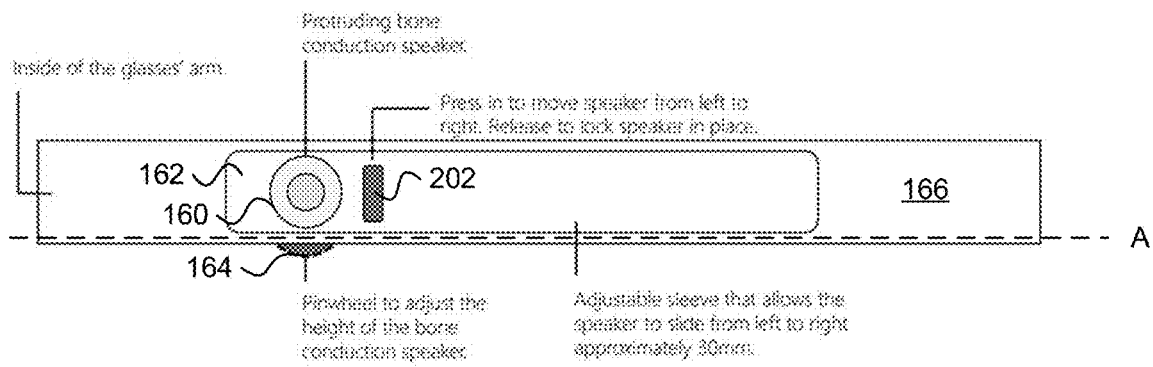
FIG. 2A depicts one embodiment of an adjustable bone conduction speaker for a head mounted display.

FIG. 2A illustrates one embodiment of a sliding member 162 that is coupled to an arm 166 of a pair of glasses 175, to a securing member 154 of an HMD device 150, and/or the like. In one embodiment, the sliding member 162 is coupled to the glasses' arm 166 in such a way that it is slidable along the first axis A. In certain embodiments, the sliding member 162 further comprises a locking member 202 that is configured to lock the sliding member in position along the first axis A.

For instance, in order to slide the sliding member 162 along the first axis A, the user may need to push or pull the locking member 202 to release it, slide the sliding member 162 into place, and then release the locking 202 to lock the sliding member 162 in place. In such an embodiment, the position of the locking member 202 is one of a plurality of predefined positions located along the first axis A. For example, the locking member 202 may have a tab or other protrusion that sits in a groove, opening, hole, or the like in the arm 166 at a predefined location on the arm 166.

A pinwheel 154 may be used to adjust protrusion member, e.g., the bone conduction speaker 160 closer to or away from the user's head. For example, a user may turn the pinwheel 164 in one direction to cause the bone conduction speaker 160 to move closer to the user's head, e.g., put more pressure against the user's head, and may turn the pinwheel 164 in the opposite direction to cause the bone conduction speaker 160 to move away from the user's head.

In such an embodiment, the pinwheel 164 may be connected to one or more gears, screws, and/or the like that work together to increase or decrease the height of the bone conduction speaker 160, e.g., move it closer or away from the user's head, when the pinwheel 164 is turned one way or the other.

Figure 2B:
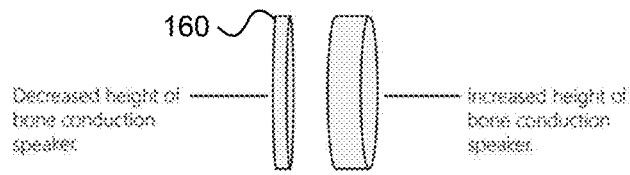
FIG. 2B depicts one embodiment of an adjustable bone conduction speaker for a head mounted display.

FIG. 2B illustrates one example embodiment of a bone conduction speaker 160. The bone conduction speaker 160, as explained above, is a device that conducts sounds through the bones of the skull by vibrating the bones. The bone conduction speaker 160 may be various sizes, shapes, and made of different materials.

Figure 2C:
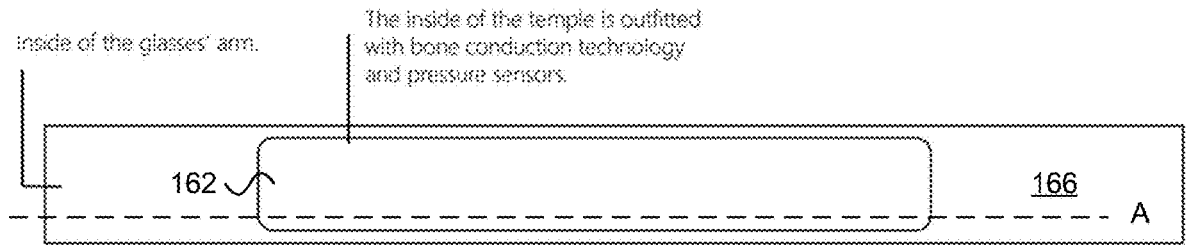
FIG. 2C depicts one embodiment of an adjustable bone conduction speaker for a head mounted display.

FIG. 2C illustrates another example embodiment of a sliding member 162 that is coupled to an arm 166 of a pair of glasses 175, to a securing member 154 of an HMD device 150, and/or the like. In the depicted embodiment, the bone conduction speaker 160 is integrated into the sliding member 162 so that they are one in the same. In such an embodiment, the pressure of the sliding member 162 against a user's head may be manually adjusted, e.g., using one or more pinwheels 164 that move the sliding member 162, or portions of the sliding member 162, towards or away from the user's head.

In some embodiments, the position of the sliding member 162 along the first axis A and/or the second axis B may be adjustable by electronic and/or automatic means, as explained in more detail below, based on input received from one or more pressure sensors, proximity sensors, and/or the like that are integrated with the sliding member 162 and/or the arm 166.

In certain embodiments, a plurality of bone conduction speakers 160 are located along the sliding member 162 in a line, at random locations, at various locations along the sliding member 162, and/or the like. In some embodiments, the bone conduction speakers 160 may be selectively turned off and on. For example, each bone conduction speaker 160 may have an associated physical switch or button located on the glasses' arm 166 or on a securing member of an HMD 150 that is configured to activate/deactivate, enable/disable, or the like the bone conduction speaker 160. In some embodiments, a single switch or button may be used to turn the bone conduction speakers 160 on and off collectively. In various embodiments, the bone conduction speakers 160 are selectively turned on and off, independently and/or as a set, via an interface control of a display unit 154 of the HMD unit 150, the glasses 175, or the like. In further embodiments, the bone conduction speakers 160 are configured to be selectively turned on and off for spatial audio based on the audio characteristics of an application, e.g., a media player, a game, or the like, executing on the HMD unit 150, on the glasses 175, and/or the like.

Figure 3:
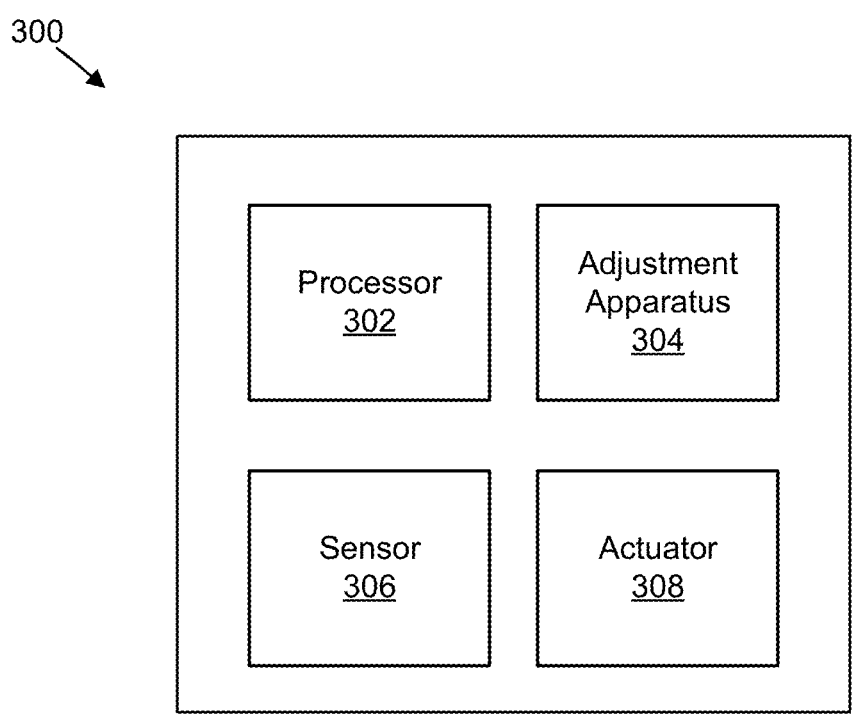
FIG. 3 is a schematic block diagram illustrating one embodiment of a computing system for an adjustable bone conduction speaker for a head mounted display.

FIG. 3 depicts one embodiment of a computing system 300 for an adjustable bone conduction speaker for a head mounted display unit. In one embodiment, the computing system 300 includes a processor 302, which may be coupled to various computing components not shown in FIG. 3, such as memory, a display, a storage device, a networking interface, a graphics card, and/or the like.

The adjustment apparatus 304, in one embodiment, is configured to electronically control the sliding member 162 and/or the bone conduction speakers 160 on an HMD unit 150, glasses 175, and/or the like. In such an embodiment, the adjustment apparatus 304 may be located in a display unit 154, in a glasses' frame such as the arm 166, and/or the like and may be receive instructions from the processor 302 via an interface such as a graphical interface, a voice-command interface, a gesture interface, and/or the like.

In one embodiment, the adjustment apparatus 304 provides an interface, e.g., on a display unit 152, on a smart phone communicatively coupled to the HMD unit 150 or glasses 175, and/or the like, for digitally controlling the positions of the sliding member 162 and/or the protrusion member, e.g., the bone conduction speaker 160. In such an embodiment, the adjustment apparatus 304 provides graphical controls for selecting positions for the sliding member 162 and/or the protrusion member, e.g., the bone conduction speaker 160. The interface may include controls for a plurality of sliding members 162 and/or bone conduction speakers 160 that are part of the HMD unit 150 and/or the glasses 175. Furthermore, the adjustment apparatus 304 may provide controls for other characteristics of the bone conduction speaker 160 such as a sensitivity level, a vibration level, a volume, and/or the like.

In one embodiment, the adjustment apparatus 304 automatically controls a position of the sliding member 162 along the first axis A and/or a position of the bone conduction speaker 160 along the second axis B based on input from a pressure or proximity sensor, based on input from a user, e.g., input from a user provided via a graphical interface, a voice command, a gesture (e.g., a hand gesture, a face gesture, an eye gesture, or the like), and/or the like.

In various embodiments, the adjustment apparatus 104 may be embodied as part of an information handling device 102 such as a headset, a head mounted display, a smart device, a network device, an Internet of Things device, a computing device, or as a hardware appliance that can be installed or deployed on an information handling device 102, on a server 108, on a user's mobile device, on a display, or elsewhere on the data network 106.

In certain embodiments, the adjustment apparatus 104 may include a hardware device such as a secure hardware dongle or other hardware appliance device (e.g., a set-top box, a network appliance, or the like) that attaches to a device such as a head mounted display, a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the adjustment apparatus 104 may include a power interface, a wired and/or wireless network interface, a graphical interface that attaches to a display, and/or a semiconductor integrated circuit device as described below, configured to perform the functions described herein with regard to the adjustment apparatus 104.

The adjustment apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the adjustment apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the adjustment apparatus 104.

The semiconductor integrated circuit device or other hardware appliance of the adjustment apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the adjustment apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The adjustment apparatus 304, in one embodiment, may receive input from various sensors 206 such as a pressure sensor, a proximity sensor, and/or the like that are located on an HMD securing member 154 or a glasses' arm 166 after a user places the HMD unit 150 or glasses 175 on his/her head. In such an embodiment, the pressure sensor and/or proximity sensor is located near, adjacent, on, proximate, and/or the like to the bone conduction speaker 160. The sensor input may be a pressure detected using the pressure sensor, for example, which may be compared with a predefined pressure for the bone conduction speaker 160 that is used to determine an optimal, satisfactory, functional, or the like pressure against the user's head for providing audio via the bone conduction speaker 160.

Similarly, the sensor input may be a proximity detected using the proximity sensor, for example, which may be compared with a predefined proximity for the bone conduction speaker 160 that is used to determine an optimal, satisfactory, functional, or the like distance between the user's head and the bone conduction speaker 160. Other sensor input may be used such as camera input, infrared input, motion input, biometric information, and/or the like.

Based on the sensor input, e.g., based on a camera input showing a location of the sliding member 162 relative to the user's head, the adjustment apparatus 304 determines a location for the bone conduction speakers 160 along the first axis A, which determines whether the sliding member 162 needs to move along the first axis A. Furthermore, the adjustment apparatus 304 determines a distance to increase or decrease the height of the bone conduction speaker 160 along the second axis B based on the pressure and/or proximity information from the pressure and proximity sensors.

In such an embodiment, the adjustment apparatus 304 may be in communication with an actuator 308, either directly or via a controller, that is configured to cause the sliding member 162 to move along the first axis A and/or to cause the bone conduction speaker 160 to move along the second axis B. The actuator 308 may be an electrically-driven motor, a set of gears, and/or the like that is controllable by instructions provided by the adjustment apparatus 304 and/or the processor 302.

Figure 4:
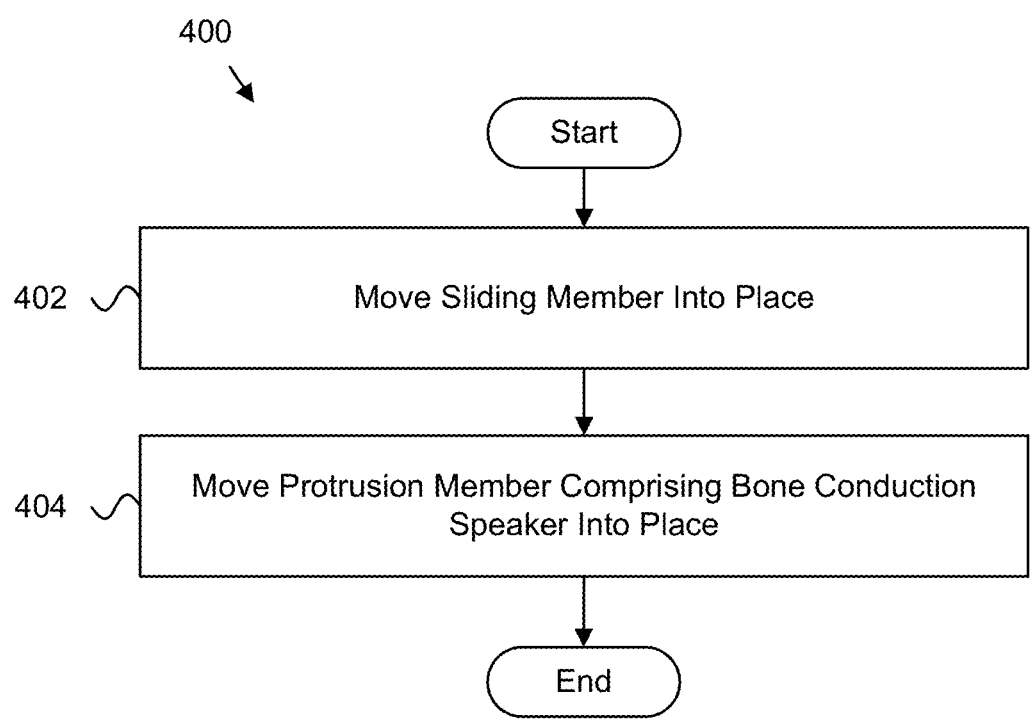
FIG. 4 is a schematic flow chart diagram illustrating one embodiment of a method for an adjustable bone conduction speaker for a head mounted display.

FIG. 4 is a schematic flow chart diagram illustrating one embodiment of a method 400 for adjustable bone conduction speaker for head mounted display. In one embodiment, the method 400 begins and moves 402, by a processor, a sliding member 162 into position along a first axis A. In further embodiments, the method 400 moves 404 a protrusion member comprising the bone conduction speaker 160 into position along a second axis B, and the method 400 ends. In one embodiment, the adjustment apparatus 304 performs the various steps of the method 400.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a sliding member couplable to a head mounted display ("HMD") unit and comprising at least one bone conduction speaker, the sliding member adjustable along a first axis to position the bone conduction speaker along the first axis;

a protrusion member coupled to the sliding member and housing the at least one bone conduction speaker, the protrusion member adjustable along a second axis, substantially perpendicular to the first axis, to position the bone conduction speaker along the second axis; and at least one pressure sensor, wherein the at least one bone conduction speaker is activated in response to pressure detected from the at least one pressure sensor satisfying a predefined pressure threshold.

2. The apparatus of claim 1, wherein the sliding member further comprises a locking member configured to lock the sliding member in position along the first axis.

3. The apparatus of claim 2, wherein the position is one of a plurality of predefined positions located along the first axis.

4. The apparatus of claim 1, wherein the protrusion member is adjustable using an adjustment mechanism to increase or decrease a height of the protrusion member along the second axis.

5. The apparatus of claim 4, wherein the adjustment member comprises a pinwheel member that is rotatable to increase or decrease the height of the protrusion member along the second axis.

6. The apparatus of claim 1, wherein the sliding member and the protrusion member are located on a portion of the HMD unit that is positioned against a side of a user's head.

7. The apparatus of claim 1, wherein the sliding member comprises a plurality of bone conduction speakers along a length of the sliding member that are configured to be selectively turned on and off.

8. The apparatus of claim 7, wherein the each of the plurality of bone conduction speakers are selectively turned on in response to pressure detected from pressure sensors in the sliding member that correspond to the plurality of bone conduction speakers sensing a pressure that satisfies a threshold pressure.

9. The apparatus of claim 1, wherein:
the protrusion member further comprises at least one a proximity sensor; and
the protrusion member is automatically adjusted along the second axis until a proximity that the at least one proximity sensor senses satisfying satisfies a proximity threshold.

10. An apparatus, comprising:
a securing member of a head-mounted display ("HMD") unit configured to secure the HMD unit to a user's head;
a sliding member coupled to the securing member and comprising at least one bone conduction speaker, the sliding member adjustable along a first axis to position the bone conduction speaker along the first axis;
a protrusion member coupled to the sliding member and housing the at least one bone conduction speaker, the protrusion member adjustable along a second axis, substantially perpendicular to the first axis, to position the bone conduction speaker along the second axis; and
at least one pressure sensor, wherein the at least one bone conduction speaker is activated in response to pressure detected from the at least one pressure sensor satisfying a predefined pressure threshold.

11. The apparatus of claim 10, wherein the at least one bone conduction speaker is located near the at least one pressure sensor on the securing member.

12. The apparatus of claim 10, wherein the sliding member and the protrusion member are located on the securing member at a location that is positioned against a side of a user's head.

13. The apparatus of claim 10, wherein the sliding member further comprises a locking member configured to lock the sliding member in position along the first axis.

14. The apparatus of claim 13, wherein the position is one of a plurality of predefined positions located along the first axis.

15. The apparatus of claim 10, wherein the protrusion member is adjustable using an adjustment mechanism to increase or decrease a height of the protrusion member along the second axis.

16. The apparatus of claim 15, wherein the adjustment member comprises a pinwheel member that is rotatable to increase or decrease the height of the protrusion member along the second axis.

17. The apparatus of claim 10, wherein:
the protrusion member further comprises at least proximity sensor; and
the protrusion member is automatically adjusted along the second axis until a proximity that the at least one proximity sensor senses satisfies a proximity threshold.

18. A system, comprising:
a head mounted display ("HMD") unit comprising at least one display;
a securing member of the HMD unit configured to secure the HMD unit to a user's head;
a sliding member coupled to the securing member and comprising at least one bone conduction speaker, the sliding member adjustable along a first axis to position the bone conduction speaker along the first axis;
a protrusion member coupled to the sliding member and housing the at least one bone conduction speaker, the protrusion member adjustable along a second axis, substantially perpendicular to the first axis, to position the bone conduction speaker along the second axis; and
at least one pressure sensor, wherein the at least one bone conduction speaker is activated in response to pressure detected from the at least one pressure sensor satisfying a predefined pressure threshold.

19. The system of claim 18, wherein the sliding member and/or the protrusion member are adjustable via one or more digital controls of an interface of the HMD unit.

20. The system of claim 18, wherein the bone conduction speaker is one of a plurality of bone conduction speakers that are configured to be selectively turned on and off for spatial audio based on an application executing on the HMD unit.

* * * * *